Patented Jan. 2, 1923.

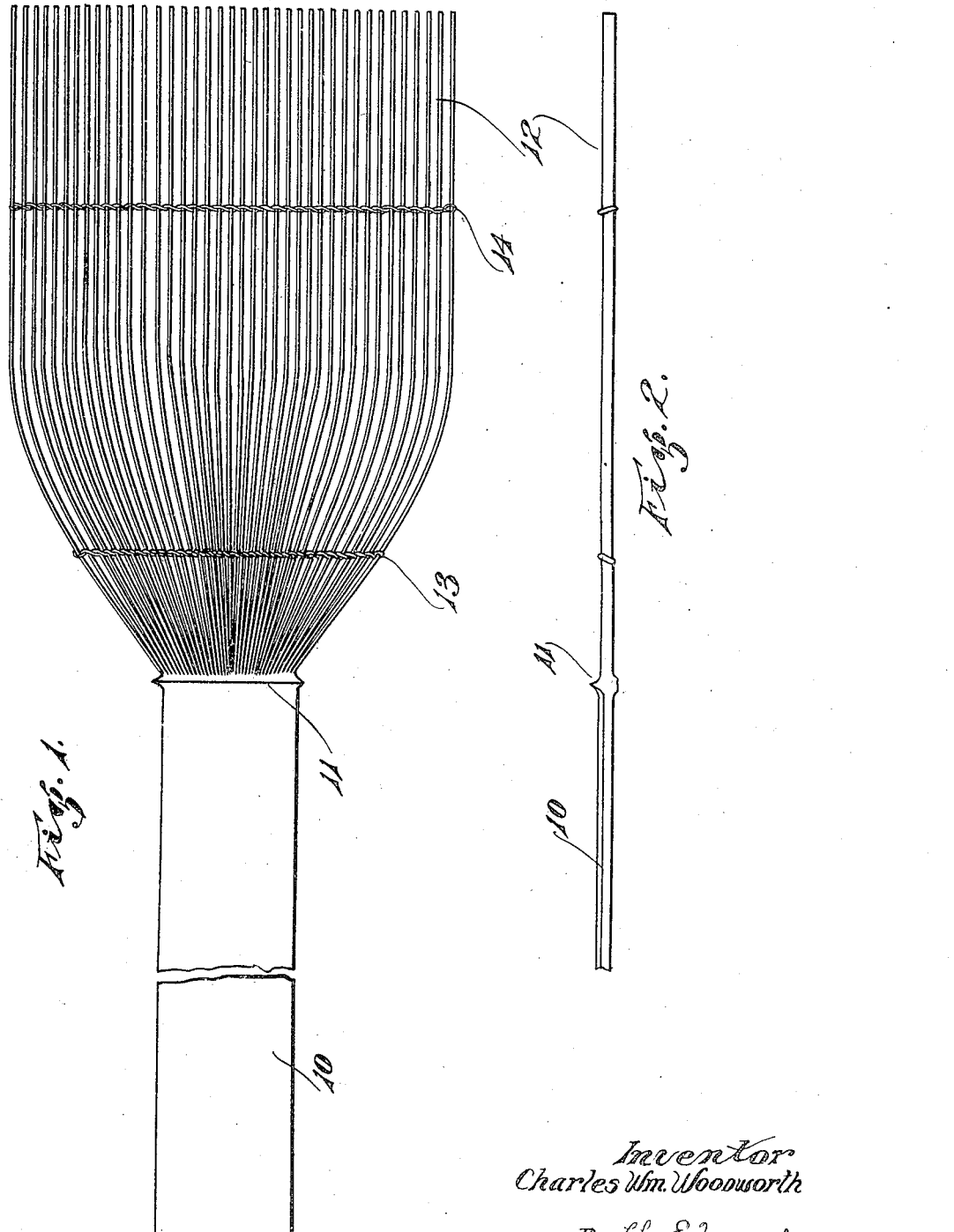

1,440,809

UNITED STATES PATENT OFFICE.

CHARLES W. WOODWORTH, OF BERKELEY, CALIFORNIA.

FLY SWATTER.

Application filed December 14, 1921, Serial No. 522,259. Renewed November 20, 1922.

*To all whom it may concern:*

Be it known that I, CHARLES W. WOODWORTH, a citizen of the United States, residing at Berkeley, in the county of Alameda and State of California, have invented new and useful Improvements in Fly Swatters, of which the following is a specification.

This invention relates to a new article of manufacture, and particularly pertains to a fly swatter and a method of producing the same.

The object of the invention is to provide an improved fly swatter which is of simple and inexpensive construction and which is devoid of metallic parts, such as are liable to injure curtains and draperies. Fly swatters are usually made of wire and the loose ends of the wires are liable to catch in curtains and draperies and cause injury thereto. It has heretofore been proposed to construct fly swatters of soft rubber, but this is not practical for the reason that it is difficult to impart sufficient stiffness to such material without presenting so much surface to the air as to render the device ineffective for the purpose intended. The present invention contemplates the forming of a fly swatter from a single stalk of bamboo by splitting the end thereof into a large number of fine splints and then spreading the splints apart and fastening them in such position. Preferably, the splints terminate near one of the nodes of the stalk and therefore there is no danger of further splitting of the stalk.

One form which my invention may assume is exemplified in the following description and illustrated in the accompanying drawing, in which—

Fig. 1 shows a plan view of a device embodying my invention.

Fig. 2 shows a side elevation of the same.

Referring in detail to the accompanying drawing, I show a segmental stalk of bamboo 10 of any desired length. A stalk is selected which has a node 11 a suitable distance from one end and this stalk is split from the node out to form a large number of fine splints 12. These splints are spread apart so as to form a widened surface offering comparatively little resistance to the air. The splints are held in spread position by means of a lacing 13 near the node, such lacing consisting preferably of heavy twine or other flexible material. One or more additional lacings 14 are arranged towards the middle of the splints. To prevent these lacings from slipping out of position a groove is formed in the bamboo stalk prior to splitting. Then, when the splints are spread apart, the notches will serve to retain the lacing in place.

By splitting the bamboo in the manner described, the edges of the splints will be presented to the air so that the device will not act as a fan to drive the flies away.

In providing a device as disclosed herein a single piece of material of comparatively little cost is utilized. The splints possess the desired resiliency for the purpose intended and the unsplit portion of the stalk provides a suitable handle for the device. The cost of constructing the device is comparatively little and the article is superior to those now in use for this purpose, due to the fact that it will not mar furniture or tear curtains and draperies.

The grain of the bamboo about the node 11 is such as to prevent further splitting of the splintered parts. In some instances, however, it may be desirable to add reinforcing means at this point.

Having thus described my invention, what I claim and desire to secure by Letters Patent is:

1. A method of producing a fly swatter which consists in splitting one end of a stalk of bamboo into fine splints and spreading the splints apart to form a widened surface offering comparatively little resistance to the air.

2. A method of producing a fly swatter which consists in splitting one end of a stalk of bamboo, terminating the splints at a node and spreading the splints apart to form a widened surface offering comparatively little resistance to the air.

3. A method of producing a fly swatter which consists in splitting the end of a bamboo stalk from the node out to form a plurality of splints, spreading the splints apart to form a widened surface and retaining the splints apart by means of lacing.

4. A fly swatter formed of one piece of bamboo splintered at one end and having the splints spread apart to form a wide surface offering comparatively little resistance to the air.

5. A fly swatter formed of one piece of bamboo splintered at one end and having the splints spread apart to form a wide surface offering comparatively little resistance to the air, and means for retaining the splints in spread position.

6. A fly swatter formed of a single piece of bamboo splintered at one end, the splints terminating at a node and being spread to form a widened surface offering comparatively little resistance to the air.

7. A method of constructing a fly swatter which consists in utilizing a longitudinal segment of a bamboo stalk, splitting one end of the stalk, spreading the splints apart and fastening the splints in spread position by means of lacing.

8. A method of constructing a fly swatter which consists in utilizing a longitudinal segment of a bamboo stalk, splitting one end of the stalk, spreading the splints apart, fastening the splints in spread position by means of lacing and forming a groove in the stalk prior to splitting to assist in retaining the lacing in place.

CHARLES W. WOODWORTH.